United States Patent Office 2,816,088
Patented Dec. 10, 1957

2,816,088

LINEAR POLYESTER COMPOSITIONS CONTAINING A HYDROQUINONE DERIVATIVE AS A HEAT STABILIZER

Roger M. Schulken, Jr., and Louis D. Moore, Jr., Kingsport, Tenn., assignors to Eastman Kodak Company, Rochester, N. Y., a corporation of New Jersey No Drawing. Application September 21, 1956,
Serial No. 611,347

4 Claims. (Cl. 260—45.9)

This invention relates to the heat stabilization of synthetic linear polyesters of high molecular weight. Linear polyesters are extensively used in textile fibers, which are subject to heating in the processes of washing, drying at elevated temperatures, ironing and pressing. Linear polyesters are also used in films and shaped articles which are subjected to heating in their various uses, such as in electrical insulation and the like. Heating tends to degrade linear polyesters, as has been discussed by H. A. Pohl in Journal of the American Chemical Society 73, 5660–5661 (1951), and by I. Marshall and A. Todd in Transactions of the Faraday Society 49, 67–78 (1953).

When polyesters are heated at elevated temperatures, they degrade in physical properties and in molecular weight as measured by the logarithmic viscosity number, $\{\eta\}$, defined by the equation $$\{\eta\} = \frac{ln(\eta/\eta_0)}{C}$$

where $\eta_0$ and $\eta$ are the viscosities respectively of pure solvent and of a solution containing C grams of polymer per 100 cc. of solvent. The logarithmic viscosity numbers reported herein were measured in a 60:40 mixture by weight of phenol:tetrachloroethane at a polymer concentration of about 0.23 grams/100 c.

In the course of our investigation of the thermal breakdown of linear polyesters, we have found that the addition of certain compounds to the polyesters retards thermal degradation. The mechanism of this protection is not completely understood, but it has been shown that oxygen has a detrimental effect; therefore, the compounds may be functioning as antioxidants. However, we have found that a great many antioxidants are not stabilizers for linear polyesters.

We have found that linear polyesters can be heat stabilized by the incorporation of a small proportion of a hydroquinone derivative selected from the group consisting of p-nitrophenyl hydroquinone,

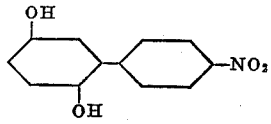

and 5,5'-bitoluhydroquinone,

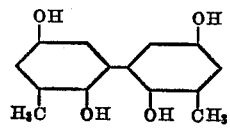

The hydroquinone derivative can be incorporated into the resin either by mixing it into the molten resin, which may then be extruded or molded, or by adding it to a solution or dope of the resin, which may then be cast as a film or spun as a filament. Concentrations of from 0.1 to 10 parts by weight of the hydroquinone derivative per 100 parts by weight of linear polyester may be used; we prefer to use from 0.3 to 3 parts per 100 parts of polyester.

The effectiveness of the stabilizer was tested by placing film strips of the polyester containing the stabilizer in a 200° C. air oven for a given length of time. The values of $\{\eta\}$ were determined before and after the heating. A comparison of these figures with those obtained on a blank of the same batch of polyester provided a measure of the stabilizing effect of the additive.

In the examples given below, the hydroquinone derivatives were incorporated in the indicated proportions with two different batches of a linear polyester designated as 3:2:5-C:S:B, made from a 3:2:5 mole ratio of azelaic acid:4,4'-dicarboxypheyl sulfone,

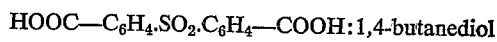

HOOC—$C_6H_4$.$SO_2$.$C_6H_4$—COOH:1,4-butanediol

| Examples | Parts Hydroquinone Derivative per 100 Parts Polyester | Polyester | $\{\eta\}$ | | |
|---|---|---|---|---|---|
| | | | Original | After 15 hrs. | After 63 hrs. |
| 1 | 1 p-nitrophenyl hydroquinone. | 3:2:5-C:S:B | 1.12 | 1.00 | |
| | None | Same | 1.09 | 0.07 | |
| 2 | 1 5,5'-bitoluhydroquinone. | 3:2:5-C:S:B | .93 | | 0.58 |
| | None | Same | 1.04 | 0.06 | |

What we claim as our invention and desire to be secured by Letters Patent of the United States is:

1. A polyester composition comprising a linear polyester of azelaic acid, 4,4'-dicarboxyphenyl sulfone and 1,4-butanediol, stabilized against degradation by heat by a content of from 0.1 to 10 parts by weight of a hydroquinone derivative selected from the group consisting of p-nitrophenyl hydroquinone and 5,5'-bitoluhydroquinone per 100 parts by weight of polyester.

2. A polyester composition comprising a linear polyester of azelaic acid, 4,4'-dicarboxyphenyl sulfone and 1,4-butanediol, stabilized against degradation by heat by a content of from 0.3 to 3 parts by weight of a hydroquinone derivative selected from the group consisting of p-nitrophenyl hydroquinone and 5,5'-bitoluhydroquinone per 100 parts by weight of polyester.

3. A polyester composition comprising a linear polyester of azelaic acid, 4,4'-dicarboxyphenyl sulfone and 1,4-butanediol, stabilized against degradation by heat by a content of from 0.3 to 3 parts by weight of p-nitrophenyl hydroquinone per 100 parts by weight of polyester.

4. A polyester composition comprising a linear polyester of azelaic acid, 4,4'-dicarboxyphenyl sulfone and 1,4-butanediol, stabilized against degradation by heat by a content of from 0.3 to 3 parts by weight of 5,5'-bitoluhydroquinone per 100 parts by weight of polyester.

No references cited.